United States Patent

[11] 3,623,777

[72] Inventors Ronald A. Sarbach
 Columbus, Ohio;
 Shantilal N. Shah, Pittsburgh, Pa.
[21] Appl. No. 875,805
[22] Filed Nov. 12, 1969
[45] Patented Nov. 30, 1971
[73] Assignee Westinghouse Air Brake Company
 Wilmerding, Pa.

[54] FLUIDIC BRAKE CONTROL SYSTEM HAVING SAFETY AND OVERSPEED CONTROL MEANS FOR RAILROAD TRAINS
13 Claims, 1 Drawing Fig.

[52] U.S. Cl. .................................................. 303/19,
 303/20, 340/279
[51] Int. Cl. ..................................................... B60t 7/14,
 B60t 13/66
[50] Field of Search .......................................... 137/599;
 235/201; 303/19, 20; 340/279

[56] References Cited
UNITED STATES PATENTS

| | | | |
|---|---|---|---|
| 3,177,481 | 4/1965 | Joy et al. ......................... | 340/279 |
| 3,312,508 | 4/1967 | Keller et al. ..................... | 303/19 |
| 3,476,442 | 11/1969 | Sarbach ........................... | 303/19 |

*Primary Examiner* — Milton Buchler
*Assistant Examiner* — Stephen G. Kunin
*Attorney* — Ralph W. McIntire, Jr.

ABSTRACT: A fluidic brake control system for a railway train interlocked with the conventional airbrake control system in which both "safety" and "overspeed" control of a bistable element is provided to control interface devices capable of effecting either a release of the train brakes or producing a penalty brake application. A safety control circuit employs a multistage binary counter to provide timing and sequencing whereby the operator is required to periodically acknowledge a counter controlled warning signal by resetting the counter to prevent occurrence of the impending penalty which is imposed by reason of the counter proceeding to its final stage. In the event the counter reaches its final stage due to the warning signal not being acknowledged in the prescribed manner, the bistable element is triggered to initiate and latch in the penalty until conditions of a logic circuit are satisfied to reset the bistable element which is accordingly conditioned to effect a release of the brakes. The overspeed control circuit employs timing means separate from the counter but employs the counter to initiate the penalty by setting its final stage to the penalty state irrespective of the normal counter sequence.

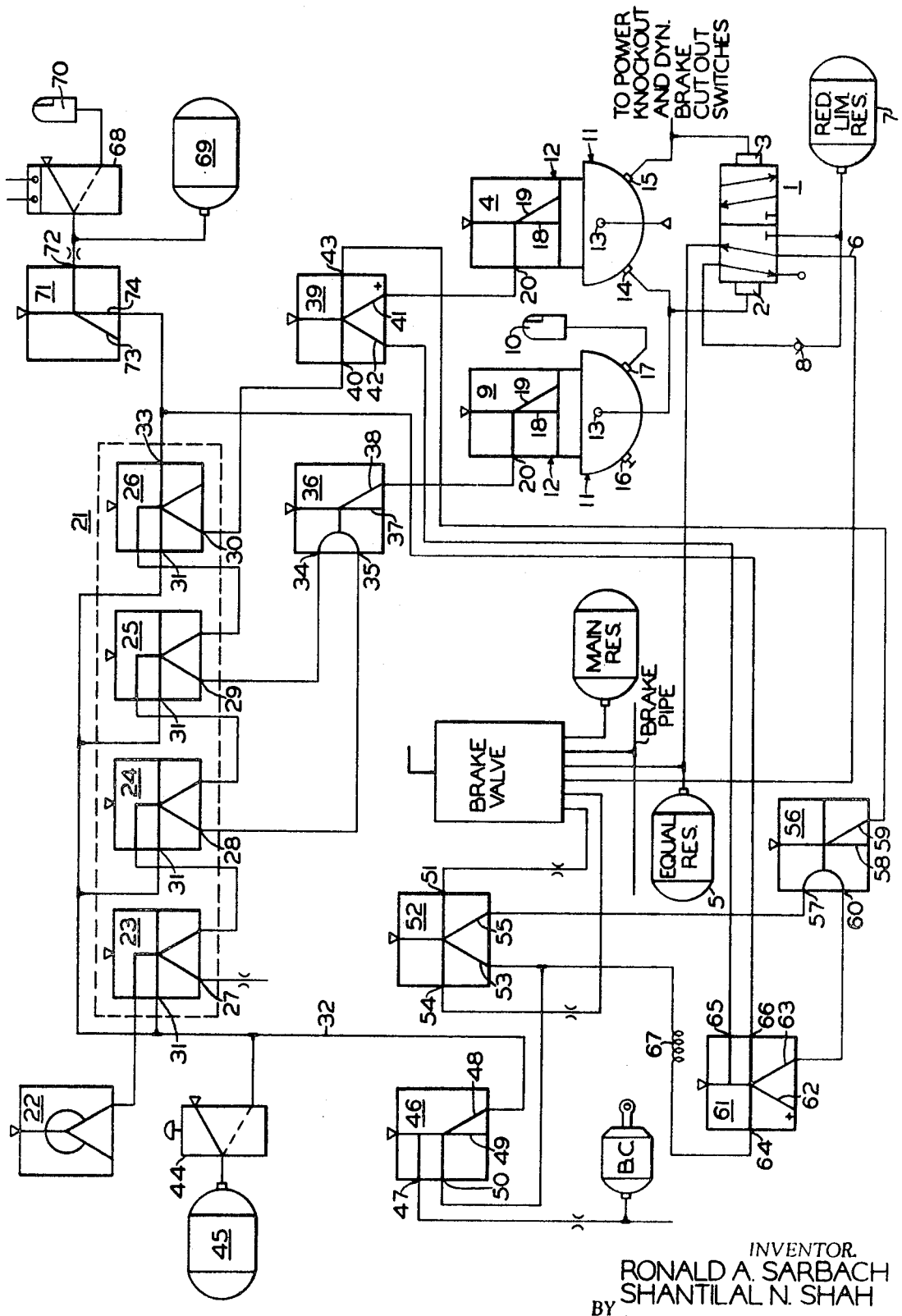

FLUIDIC BRAKE CONTROL SYSTEM HAVING SAFETY AND OVERSPEED CONTROL MEANS FOR RAILROAD TRAINS

BACKGROUND OF THE INVENTION

The railroad industry had, from its inception, been dedicated to a policy of assuring that precautionary measures are taken to maintain stringent safety standards in all aspects of its operation. In keeping with this policy, locomotive brake equipment, in freight as well as passenger service, has traditionally been designed to include a penalty brake control system, one concept of which requires either continual or periodic acknowledgment by the engineer to indicate his alertness and well being in order that he may continue to maintain control of the train. Maintaining a foot valve pedal in a depressed condition or alternately depressing and releasing the foot valve pedal are specific required functions associated with such a penalty brake control system to monitor the engineer's condition. The latter function is intended to overcome the possibility of the engineer defeating the purpose of the system by weighing down the foot valve with some object other than the foot. In the event the operator, due to his being incapacitated by his own volition, fails to fulfill the prescribed control procedure, the brake control system automatically operates to produce a penalty brake application to safely bring the train to a halt. The existing systems, with their associated piping, while being relatively reliable in operation, are quite bulky, costly and require periodic maintenance.

Other systems based on surveillance of the operator have been attempted in addition to the acknowledgement type, wherein electronic means are employed to monitor movements made by the engineer in the process of performing his normal-operating functions. Being fragile by nature and complex by necessity of design, it becomes immediately apparent that such systems are inherently unreliable, especially when subjected to such extreme environmental conditions as are known to exist in railroad service. Electronic systems, in addition to their high-initial cost, prove not only difficult to maintain in an operative condition, but are expensive to service.

Recently, the development of small fluid pressure control devices that use no moving parts other than the fluid itself has led to completely new concepts in fluid control concepts so different that a distinct technology known, for the lack of a more descriptive name, as "fluidics" has emerged. Although primarily employing the fluid-dynamic interaction phenomena which for the most part encompasses devices commonly referred to as pure fluid elements, the fluidic technology does not rule out use of spool valves, ball valves or other miniature control elements in which the moving mass is so small that response time of the device is not significantly affected. Being fluid pressure in nature, even though fluid pressures employed with fluidics are typically low, this new technology appears to lend itself well to application with fluid pressure brake control systems, particularly when employed in the area of the locomotive where a ready source of fluid supply is available.

SUMMARY OF INVENTION

It is the object of the present invention to provide a new and improved penalty brake application control circuit adapted to be interlocked with the conventional automatic brake valve control of the power brakes and comprising pure fluid devices wherein safety and overspeed control is provided to assure safe operation of a train with a low-cost, compact package which is highly reliable and relatively free of maintenance.

It is another object of the invention to provide a cycling type control of the safety control portion of the penalty brake application circuit, requiring only momentary actuation of a control mechanism periodically to forestall initiation of a penalty brake application.

In the attainment of the above objects, a four-stage binary counter is provided to obtain a binary output signal. A square wave input signal is generated by a fluidic oscillator to drive the counter. An interlock valve device is arranged so that under normal conditions, communication is established therethrough to accommodate normal brake valve control of the automatic brakes by variation of a control pressure and under penalty conditions, communication is established therethrough to reduce the control pressure and thereby cause an automatic brake application. A fluidic flip-flop device monitors the counter fourth stage to pilot a fluidic low- to high-pressure relay which in turn positions the interlock valve device to initiate the penalty.

In a safety control circuit, a predetermined duration before the penalty condition is imposed, a warning whistle is sounded to apprise the engineer of the impending penalty. A fluidic AND gate interposed between the counter and a second fluidic low- to high-pressure relax responds to the counter output signals to pilot the relay to initiate sounding of the warning whistle.

In order to forestall the impending penalty, the operator must acknowledge the warning whistle within the alotted time duration before the counter reaches the penalty stage. This can be accomplished by actuating a valve device adapted to pressurize the counter reset ports, thus resetting the counter stages. Since the counter is continuously cycling, periodic acknowledgement is required on the part of the engineer to forestall the penalty and indicate his alertness and well-being. The penalty may also be forestalled through fluidic logic circuits which also function to reset the counter whenever the operator's brake valve device is moved into suppression position or any time approximately 25 p.s.i. locomotive brake cylinder pressure exists.

Operating in conjunction with the safety control circuit is an overspeed control circuit having separate timing means whereby an electromagnet valve device monitors the locomotive engine speed to control a fluidic NOR gate which is adapted to set the counter to its fourth stage, indicating a penalty condition when the engine speed exceeds a predetermined limit.

The invention will be better understood from the following more detailed description which, when considered with the single FIGURE drawing showing a schematic representation of a fluidic penalty brake control circuit comprising the invention, will make apparent other objects and advantages to be gained.

DESCRIPTION

Referring now to the drawing, there is shown a fluidic safety and overspeed control circuit, the outputs of which pilot an interlock valve device 1 which is illustratively shown as a two position, fluid pressure operated, spool valve device. Interlock valve 1 is employed for the purpose of porting high-fluid pressure to effect certain prescribed function, as hereinafter described, in response to pressure signals effective at pilot valves 2 or 3 as derived from the alternate high-pressure outputs of a digital low- to high-pressure fluidic interface device 4. Thus, one or the other of the pneumatic pilot portions 2 and 3 of interlock valve 1 is pressurized placing the spool valve in either a first or a second position. In the first or normal position, as shown, an equalizing reservoir control volume 5 is connected via the spool valve and line 6 to a conventional locomotive brake valve device from which it is changed by a source of regulated control pressure provided by the locomotive brake valve device and is cut off from a second volume 7 (typically known as the reduction limiting reservoir) which is connected to atmosphere via a one-way check valve 8. In the second or penalty position, the spool valve cuts off charging of the equalizing reservoir volume 5 which is consequently connected to the volume 7 into which the control pressure equalizes to effect a predetermined reduction in control reservoir pressure dependent upon the size of volumes 5 and 7. As is well known in the air brake art, a reduction of equalizing reservoir control pressure at the locomotive brake valve device results in a corresponding reduction in brake pipe pressure throughout the train to cause the locomotive and train brakes to apply accordingly. It is apparent, therefore, that by actuating interface device 4 to a position in which the interlock valve 1 is forced to its second position at the time a penalty condition exists, as detected by either the safety or overspeed circuits, as will hereinafter be explained, a predetermined penalty brake application will automatically be imposed.

A low- to high-pressure interface valve device 9, similar to interface device 4 and having its connected output in series with the one output thereof, is provided to control the sounding of a warning whistle 10, which occurs periodically to apprise the engineman of an impending penalty condition which, in order to forestall or suppress, requires his acknowledgement in any one of certain prescribed ways hereinafter explained.

Interface devices 4 and 9 are each comprised of a high-pressure portion 11 and a fluidic pilot portion 12 in the form of a conventional pure fluid OR/NOR gate and are commercially available. Although not shown in detail, the high-pressure portion comprises a piston actuator to which one end of a ported rotor is movably connected so as to effect communication between a source of high-fluid pressure supply at port 13 and one or the other of output ports 14 and 15 associated with interface device 4, and output ports 16 (which is plugged) and 17 associated with interface device 9 depending upon the transverse position of the piston actuator. Being conventional in design, the OR/NOR gate comprising the pilot portion 12 includes a preferred NOR-output leg 18 and an OR-output leg 19 adapted to alternately pressurize opposite sides of the piston actuator from a regulated source of supply pressure at the power input of the device in accordance with the presence or absence of a pressure signal at control port 20 of the respective OR/NOR gates. As the piston actuator is forced to either of its extreme transverse positions in response to the OR/NOR gate output, the rotor is consequently positioned to connect a source of high-pressure supply at port 13 to one or the other of outputs 14 and 15 associated with interface device 4, and ports 16 and 17 associated with interface device 9. The small size of the components as well as the absence of sealing elements on the piston actuator, combined with the wiping or shear-seal action of the rotor with respect to the housing, permits low friction, low-inertia operation with reliable switching of the high-pressure output signals in accordance with the low-fluidic pressure state control signals.

The timing and sequencing functions of the safety control circuit are provided by a counter of any conventional type. Preferably, the timing and sequencing functions are embodied in a four-stage binary counter 21 which forms the heart of the system. The counter is driven by a fluidic free-running multivibrator or oscillator 22 capable of generating a square wave fluid pressure signal. The counter stages, as hereinafter described in detail, sequentially divide the input pulse from the oscillator in a binary fashion. Details of the oscillator 22 are not shown in the drawing due to the various standard configurations commercially available. However, the circuit configuration could, as an example, comprise a bistable flip-flop device arranged arranged so that its one control port is maintained pressurized to bias the supply stream towards the preferred output leg which is connected into a volume and the opposing control port. When the pressure in the volume builds up sufficiently to overcome the bias control signal at the one control pot, the supply stream is switched out of the preferred output where it remains until the volume pressure is dissipated below the bias pressure, at which point, the supply is returned to the preferred output. Tapping off one of the outputs, therefore, produces a square wave, the frequency of which is determined by the time required to charge and discharge the volume above and below the bias level.

Each stage of the binary counter 21, as shown diagrammatically and indicated by the reference numerals 23, 24, 35 and 26, may comprise a fluidic differentiator or "one-shot" circuit, not shown, to detect a positive going pulse and produce a short duration "spike" output and further comprises fluidic flip-flop circuitry, not shown, fabricated from two flip-flops, not shown, interconnected in a back-to-back configuration, which flip-flop circuit is triggered from the one-shot to produce the output signal at that particular stage. Cascading the stages by connecting the output of the previous stage to the differentiator of the following stage produces a binary counter with as many stages as desired. Monitoring the output signal of each stage at ports 27, 38, 29 and 30 gives the binary count sequence upon which the fluidic circuit timing and control functions are predicated. Port 31 at each stage of the counter is provided to reset the counter stages to their original state whenever a pressure signal is produced thereat by way of line 32. At the "set" input of the fourth stage 26 is a port 33 which, when pressurized, immediately sets the fourth stage to its connected output 30.

Connected to the counter second and third stage output ports 28 and 29 are the control ports 34 and 35 of a pure fluid AND-gate 36. Being conventional in design, it includes a power port to which is supplied a regulated source of fluidic pressure, a preferred NAND-output leg 37 and a connected AND-output leg 38, as well as the control ports 34 and 35. Concurrent pressurization of the control ports enables the device, in which stage the output leg 38 is pressurized from the power input and the output leg 37 is depressurized. In the disabled state, when one or both the control signals are absent, the opposite logic conditions exist at the output legs. Leg 38 is connected to control port 20 of interface device 9 whereby sounding of warning whistle 10 is controlled in accordance with the presence or absence of pressure at the AND-gate output leg 38 as dictated by timing of the counter.

A pure fluid flip-flop device 39 is provided to control initiation of a penalty brake application by controlling operation of interface 4 which in turn controls interlock valve 1. A control port 40 of flip-flop 39 is subject to the presence or absence of a fluid pressure signal output port 30 of counter stage 26. Being conventional in design, flip-flop 39 comprises a power input at which is maintained a regulated source of fluidic pressure, a pair of output ports 41 and 42 pressurized in accordance with the selective pressurization of control port 40 and an opposing control port 43 respectively. By virtue of inherent memory due to its bistable characteristic, the flip-flop device will maintain the pressurized output in a pressurized condition even though the actuating one of the control ports is thereafter depressurized, and until the opposite control port becomes pressurized.

As mentioned heretofore, pressurization of reset ports 31 at each stage of the counter by way of line 32 results in each stage of the counter being reset to its initial state from where the count sequence is started. Several ways of generating this pressure signal are available to the operator, one of which requires the momentary actuation of a push button actuated, three-way valve device 44 adapted to charge a volume reservoir 45 from a source of high pressure in its normal deactuated position, as shown. When valve device 44 is actuated by reason of the operator depressing the push button operator, fluid under pressure in volume 45 is connected to line 32 and to the reset ports 31 at each counter stage. The counter is also reset any time locomotive brake cylinder pressure is developed above a predetermined value (approximately 25 p.s.i.). A pure fluid OR-gate 46 provides this function by sensing brake cylinder pressure supplied to a control port 47 by way of a pressure restrictor. Being conventional in design, OR-gate 46 comprises a power input to which is supplied a regulated source of fluidic pressure, an OR-output leg 48 having communication with line 32, a preferred NOR-output leg 49 having communication with atmosphere, and a control port 50 in addition to control port 47. The OR-output leg 48 is pressurized and the NOR-output leg 49 depressurized when either one or both control ports are pressurized. Conversely, NOR-leg 49 is pressurized and OR-leg 48 depressurized when the device assumes its preferred state due to neither control port 47 nor 50 being pressurized.

Still another means of resetting the counter is available by placing the locomotive brake valve device in suppression position. This condition is sensed by the pressure state condition at control port 51 of a conventional pure fluid flip-flop device 52, the one output leg 53 of which is connected to the control port 50 of OR-gate 46 to effect the counter reset function. An opposing control port 54 is provided to cause the flip-flop to switch to its opposite state in which an output leg 55 is pressurized in accordance with pressurization of the control port 54 by way of a pressure restrictor when the brake valve device is moved to release position.

In accordance with releasing a penalty initiated brake application, as will hereinafter be more fully explained, a pure fluid AND-gate 56 is provided, being conventional in design similar to AND-gate 36. AND-gate 56 is subject at its one control port 57 to the pressure state signal effective at output 55 of flip-flop 52. Control of the regulated fluidic source of supply pressure to either a preferred output leg 58 having communication with the atmosphere or to a connected output leg 59 is afforded by the combined pressure state signals effective at control port 57 and a second control port 60. The pressure state of the connected output leg 59 is monitored by the control port 43 of flip-flop device 39 to reset the flip-flop from its penalty state when the output signal at port 30 of counter stage 26 disappears.

A pure fluid flip-flop device 61 is provided to control the pressure state at the control port 60 of AND-gate 56 and thus influence the penalty reset function of flip-flop 39. Being conventional in design, flip-flop device 61 comprises a power input to which a regulated source of fluidic pressure is maintained for supplying an output leg 62 having communication with the atmosphere or an output leg 63 connected to control port 60 of AND-gate 56 in accordance with the pressure state conditions effective at a control port 64 or at opposing parallel control ports 65 and 66 respectively. The pressure state condition effective at control port 64 is dependent upon the state of flip-flop 52, its output 53 being connected to control port 64 by way of a delay means 67. Connecting output leg 53 to control port 64 with a longer than normal length of tubing wound in the shape of a coil for the sake of compactness will conveniently provide the delay means for a purpose which will hereinafter become apparent.

The overspeed portion of the control circuit is arranged to operate in conjunction with the above-described safety control portion and comprises an electromagnetic type, three-way valve device 68, a volume 69 into which fluid under pressure is normally charged from a high-pressure source, a warning whistle 70 adapted to be sounded in response to the fluid pressure in volume 69 at the time the electromagnetic valve is actuated, and a pure fluid NOR-gate 71, also subject at its control port 72 to the fluid pressure effective in volume 69. In the enabled state of NOR-gate 71, pressure supply is directed to an output leg 73 which is communicated with atmosphere, while in the disabled state, when control pressure is absent, the supply pressure attaches to its preferred output leg 74 which is connected to port 33 at the set input of counter stage 26 and to control port 66 of flip-flop device 61. Regardless of the state of the counter, counter stage 26 is set to produce an output at port 30 to invoke a penalty brake application independent of the continued sequencing of the counter.

In now describing the operation of the penalty brake control system, let it be assumed that the pure fluid circuit elements are in an active condition by reason of regulated low-fluid pressure suitable for operation of such elements being provided at their power input from a source of high-fluid pressure stored in the locomotive main reservoirs. Where these pure fluid elements are of the monostable type, the low-pressure power stream attaches to a preferred output leg in the absence of a pressure state control signal, switching to the opposite output leg when a pressure state control signal is presented; where these elements are of the bistable class, the power stream remains attached, in the absence of a control signal, to the output leg to which it was last attached, switching to the opposite output leg when the pressure state control signal is reversed from its previous input. Also provided is a regulated source of high-fluid pressure supply for charging volume 45 and 69 associated with push button valve 44 and electromagnet valve 68, respectively, it being understood that fluid pressure stored in the locomotive main reservoir also provides the source of regulated high-fluid pressure. In further establishing conditions under which the circuit functions are initiated, binary counter 21 is driven by a square wave clock pulse generated at the connected output of oscillator 22 whereby the input signal effective at the first counter stage 23 is halved at its output with each succeeding stage 24, 25 and 26 further halving the input signal from the output of the previous stage. The counter 21 thus converts the oscillator clock pulse into binary code which provides the option of selecting different ones of, or combinations of outputs to vary timing and sequencing of the warning and penalty signals to be derived therefrom.

Until the counter sequence, which controls the safety control portion of the system, reaches its final or penalty stage 26, output port 30 thereof remains in a depressurized state in which a pressure state signal is absent from control port 40 of flip-flop 39. Assuming flip-flop 39 has been previously reset from its penalty state in which a pressure state signal occurred at output leg 41 thereof, as will be hereinafter explained, output leg 41 is depressurized such that a pressure state signal is absent at control port 20 of interface 4. Consequently, supply pressure at the power input of the OR-gate portion 12 assumes its preferred path in which output leg 18 is pressurized to position the actuator piston (not shown) in the high-pressure portion 11 such that its rotor (also not shown) is moved to connect a source of high-fluid pressure effective at port 13 to output 14 and to vent output 15 connected to pilot operator 3 of interlock valve 1. Fluid pressure at output 14 is connected to pilot operator 2 of interlock valve 1 which is accordingly forced to a normal position wherein connections are made, as indicated in the left-hand envelope of the valve diagrammatic, to register communication of fluid pressure effective in line 6 with the equalizing reservoir control volume 5 which is appropriately cut off from vented volume 7. Being well established in the airbrake art, it is understood that supply pressure effective in line 6 is under control of the operator whereby his selective movement of the locomotive automatic brake valve handle between release and service positions proportionally varies the fluid pressure supplied via line 6 and which is effective in the equalizing reservoir control volume 5 for corresponding brake pipe pressure adjustment throughout the train for control of the brakes. With the locomotive brake valve device in release position, supply pressure is maintained effective in line 6 at a predetermined maximum value to charge the equalizing reservoir control volume 5 by way of the interlock valve 1, as previously explained, and the automatic brake valve device functions in the well-known manner to accordingly charge brake pipe pressure for release of the train brakes so that the train may proceed.

With these initial conditions established, a preferred arrangement of the invention, as shown, employs AND-gate 36 to detect a signal from the counter as evidenced by counter output ports 28 and 29 each producing pressure signals concurrently so that the signal occurs a certain time duration after the count sequence is initiated. Resetting the counter stages to their initial condition to start the count sequence may be accomplished in several ways, hereinafter explained in detail, all of which result in pressurization of line 32 leading to the reset control port 31 of each counter stage. Depending upon the frequency of the oscillator pulse train therefore, the warning whistle 10 may be controlled to sound a predetermined duration after the counter is reset. Accordingly, AND-gate 36 is enabled by the presence of pressure state signals at its control ports 34 and 35 whenever the counter proceeds to a count where a pressure state signal occurs at outputs 28 and 29 of counter stages 24 and 25 respectively. Consequently, AND-gate 36 is enabled whereby its power stream is diverted from its preferred output leg 37 to its connected output leg 38 from which control port 20 of interface device 9 is pressurized. This consequently results in interface device 9 being enabled by reason of the power stream of the pilot portion OR gate being diverted from the preferred leg 18, in which the power stream is normally stable in the absence of a control signal, to the OR-leg 19 whereby the piston actuator in the high-pressure portion 12 is piloted to a position in which the rotor places port 13 in communication with output port 17. Until the counter proceeds sufficiently to produce a pressure state signal at output 30 of counter stage 26, interface device 4, as above explained, assumes a preferred state in which high-fluid pressure is ported to output 14. This output pressure, being connected to port 13 of interface device 9, is supplied by way of its output 17 to the whistle 10 which is accordingly sounded to apprise the engineman of an impending penalty brake application.

From a cursory examination of the binary code which the counter stages duplicate, it will be seen that the pressure state condition at outputs 28 and 29 of counter stages 24 and 25 remain until output 30 of counter stage 26 is pressurized to assure that the whistle continues to sound until the counter is either reset or the penalty situation is imposed.

The institution of any one of three functions is sufficient to reset the counter; namely, manual acknowledgement by the engineman by control of push button valve device 44, or by movement of the locomotive brake valve into suppression position (which automatically causes a full service brake application), or by the presence of approximately 25 p.s.i. brake cylinder pressure effective on the locomotive such as, for example, by making an automatic or an independent brake application.

Volume 45 associated with push button valve 44 is normally charged by way of the valve portion thereof from a high-pressure source. Depressing the push button operator of valve 44 results in supply pressure being cut off from volume 45 which is accordingly connected by valving to line 32 into which the volume pressure drives a pressure signal which is effective at reset ports 31 of each counter stage to recycle the counter, thereby preventing the counter from proceeding to its penalty stage 26. Since the push button operator of valve 44 must be released to reestablish charging of volume 45, it will be apparent that devious attempts to defeat the periodic acknowledgement function required to forestall the penalty by permanently maintaining a weight on the push button cannot be achieved by reason of the fact that the pressure in line 32 is continually being dissipated at vent ports provided in the pure fluid elements comprising the counter 21, thus assuring that the counter reset signal will eventually disappear. Also, since each counter stage has inherent memory, it will be apparent that only a momentary actuation of the push button operator is necessary to effectively recycle the counter, thus relieving the demand upon the engineman to continually maintain contact with a safety control valve.

Also provided to pressurize line 32 when either a predetermined amount of locomotive brake cylinder pressure is effective or the locomotive brake valve is moved to suppression position is pure fluid OR-gate 46. Control port 47 of OR-gate 46 senses brake cylinder pressure by way of a restrictor which drops the pressure linearly to fluidic levels so that when approximately 25 p.s.i. locomotive brake cylinder pressure exists, control pressure at port 47 is sufficient to switch the power stream from its preferred output leg 49 to output leg 48 which is connected to line 32, thus resetting the counter.

Pure fluid bistable device 52 is normally conditioned, by reason of the locomotive brake valve being in release position, and a pressure state signal being thus provided at control port 54 such that its power stream is diverted to output leg 55 to which is attached in the absence of a pressure state signal at opposing control port 51. Movement of the brake valve out of release position to suppression position results in control ports 51 being pressurized with the corresponding loss of the pressure state signal at control port 54. Thus, with the brake valve in suppression position, the power stream is switched to output leg 53 which it remains attached until the control signals are again reversed. The signal at output leg 53 is connected to a second control port 50 of the pure fluid OR-gate 46 which is thereby enabled as previously described to pressurize line 32 and reset the counter.

In the event the engineman fails for any reason to acknowledge the warning whistle or conditions are not satisfied to suppress the impending penalty within a predetermined period and in the prescribed manner as just described for the purpose of preventing a penalty condition from occurring, the counter will proceed to produce a pressure state signal at output 30 of penalty stage 26. At the same time, the pressure state signals at outputs 28 and 29 of counter stages 24 and 25 is removed, disabling AND-gate 36 which returns to its preferred state in which its output pressure state signal switches from leg 38 to preferred leg 37. Accordingly, interface device 9 is disabled by the loss of pressure at control port 20 of pilot portion 12 to terminate sounding of the warning whistle 10 due to fluid pressure supplied by way of interface device 4 being ported to output 16 which is plugged to assure the normal state of interface device 1 by maintaining pressurization of pilot valve 2.

Control port 40 of pure fluid flip-flop 39 is pressurized in the pressure state of output 30 whereby the fluid element power stream is switched from output leg 42 to output 41 where it remains even after the control signal at port 40 is removed for purposes hereinafter explained. Accordingly, interface device 4, in the penalty state of flip-flop 39, is enabled by the pressure signal effective at control port 20 of its pilot portion 12 whereby the power stream of the fluidic element is switched from its preferred leg 18 to leg 19. Consequently, the high-pressure portion 11 functions to establish fluid pressure communication between port 13 and port 15 thereof which pressurizes pilot valve 3 while at the same time venting output 14 and pilot valve 2. This results in interlock valve device 1 being repositioned to a penalty state to cut off the charging communication between port 6 and the equalizing reservoir volume which is connected, by way of the interlock valve spool, to the previously vented reduction limiting reservoir 7 where fluid pressure equalization therebetween occurs to effect a reduction in equalizing reservoir control pressure and thereby produces a corresponding automatic train brake application. In accordance with pressurization of pilot operator 3 to effect the penalty condition of interlock valve 1, a power knockout and dynamic brake cutout switch may also be pressurized to cut off the dynamic brakes and shut down the locomotive traction motors.

It is axiomatic from the foregoing that when brake cylinder pressure develops at the locomotive to approximately 25 p.s.i., due to a penalty brake application occurring, the counter stages will be reset through OR gate 46; however, penalty flip-flop 39, due to its memory feature, will latch in the penalty until the proper release procedure is accomplished, as hereinafter explained.

Check valve 8 is provided for the purpose of allowing the engineman the option of making a further reduction in equalizing reservoir control pressure effective in control volume 5 after equalization thereof into the volume 7 incident to effecting a penalty brake application, upon which occurrence, normal control of the equalizing reservoir control pressure by way of the charging control line 6 is cut off by movement of interlock device 1 to penalty position. In penalty position of interlock device 1, a reduction in equalizing reservoir charging line 6 results in equalizing reservoir control pressure being able to backflow from volume 5 by way of the interface spool and volume 7, one-way check valve 8, and again by way of the spool to follow the reduction effective in line 6, thus allowing the engineman to make a further reduction in equalizing reservoir control pressure (by operating the automatic brake valve) below that normally obtained by equalization into volume 7 whereby a heavier brake application may be produced under control of the operator in the event the penalty brake application obtained is not sufficient to bring the train under control. Check valve 8 prevents flow in the opposite direction from the equalizing reservoir charging line 6 to the control volume 5 to prevent a penalty brake application from being released by the engineman except by the proper procedure as hereinafter explained.

In order to release a penalty imposed brake application and restore the system to its normal condition, interlock valve 1 must be reset to its normal state to accommodate the supply and release of fluid pressure effective in the equalizing reservoir control volume 5 in the usual fashion to effect control of the train brakes with the locomotive automatic brake valve device. This can only be accomplished by first moving the brake valve into suppression position and subsequently back to release position.

Placing the locomotive brake valve in suppression position assures that the counter is recycled if not already accomplished to initiate a new count sequence as previously explained by driving the power stream of flip-flop 52 from output 55 to output 53 which in turn causes OR-gate 46 to be enabled to reset the counter stages. This removes the pressure state signal effective at output 30 of counter stage 26, thus depressurizing control port 40 of flip-flop 39. Being bistable in nature, however, its power stream remains attached to leg 41 to maintain the penalty state of the system.

Pressurization of output 53 of flip-flop 52 also results in pressurization of control port 64 of flip-flop 61 after a slight delay imposed by delay means 67 while the pressure state control signal effective at control port 57 of AND-gate 56 in release position of the brake valve device is being dissipated. The purpose of the delay means is to allow pressure at port 57 of AND-gate 56 to dissipate before pressurization of control port 64 of flip-flop 61 is able to divert its power stream to output 63 and consequently pressurize the second control port 60 of AND-gate 56 which is thus maintained in its preferred state in which its power stream is connected to output leg 58. Without delay means 67, it is apparent that due to the speed of response attributed to fluidic control elements, flip-flop 61 could be enabled before the effective pressure signal at control port 57 could be dissipated, thus momentarily presenting pressure state signals at both control ports 57 and 60 of AND-gate 56 to enable the device for sufficient duration to inadvertently reset flip-flop 39 from its penalty state.

With removal of the pressure state signal from control port 57 when control port 60 is presented with a pressure state signal in suppression position therefore, flip-flop 39 remains conditions by its inherent memory characteristic to maintain the penalty state of the circuit until such time as the brake valve device is returned to release position. Upon this occurrence, control port 51 of flip-flop device 52 is depressurized and control port 54 is pressurized whereby the fluid power stream of flip-flop 52 is switched from output leg 53 back to output leg 55 to consequently pressurize control port 57 of AND-gate 56. Since flip-flop 61 is bistable in character, its power stream remains connected into the output leg 63 even after the pressure state signal is removed from control port 64 when output 53 of flip-flop 52 is depressurized whereby pressure state signals occur at both control ports 57 and 60 of AND-gate 56. Consequently, AND-gate 56 is enabled wherein its fluid power stream is diverted out of its preferred leg 58 into output leg 59 to pressurize control port 43 of flip-flop device 39. Since, as previously explained, control port 40 is depressurized by reason of the counter being reset, the fluid power stream of flip-flop 39 is switched from its output leg 41 into leg 42. Accordingly, control port 20 at the pilot portion 12 of interface device 4 is depressurized and the pressure state of outputs 14 and 15 is reversed whereby fluid pressure is vented from pilot portion 3 and is reestablished at pilot portion 2 of interlock device 1 which is accordingly moved from its penalty position to its normal position in which the penalty imposed brake application is released by reason of equalizing reservoir control pressure being recharged from line 6 to volume 5 as previously described.

In order to restore the circuit to its initial condition, the fluid power stream of bistable flip-flop 61 is driven from output leg 63 to leg 62 by pressurization of control port 65 at the time flip-flop 39 is reset. This results in loss of pressure at control port 60 of AND-gate 56 the fluid power stream of which accordingly assumes its preferred output leg 58 wherein the device is disabled and the pressure state signal at control port 43 of flip-flop 39 is dissipated.

The overspeed portion of the system functions to apprise the engineman of a discrepancy condition existing with respect to the traction motors. Electromagnet valve device 68 detects the motor speed, being normally conditioned wherein a volume reservoir 69 is charged via the electromagnet valving by a source of high-fluid pressure. The fluid pressure effective in reservoir 69 is reflected at the control port 72 of OR-gate 71 so that under normal conditions, the fluid power stream is diverted from its preferred leg 74 to its output leg 73. Thus, control port 66 of flip-flop 61 is vented as is the set control port 33 of counter stage 26 whereby the deactivated state of the circuit is assured.

In the event an overspeed condition occurs, however, electromagnet 68 will respond to the discrepancy by interrupting the fluid pressure supply to volume 69 which is connected to warning whistle 70. The volume of reservoir 70 is selected so that fluid pressure is expelled by way of the whistle which is sounded for a predetermined period until the pressure effective at control port 72 can no longer maintain NOR-gate 71 in its disabled state. If the discrepancy condition is not rectified within this period, the fluid power stream of the NOR-gate 71 assumes its preferred output leg 74 whereby control port 66 of flip-flop 61 and control port 33 of counter stage 26 are pressurized. Consequently, counter stage 26 is set wherein a pressure state signal is produced at output 30 thereof to drive flip-flop 39 to its penalty state in which a power knockout switch shuts down the traction motors and a penalty brake application is automatically produced as described with respect to the safety control portion of the system.

In order to release this penalty imposed brake application, the same procedure required to release a safety controlled penalty must be followed provided the overspeed condition has been corrected. The purpose of the pressure state signal at control port 66 of flip-flop 61 is to prevent the engineman from preconditioning flip-flop 61 to release the brakes without first correcting the overspeed condition which initiated the penalty. It will be seen that the presence of a pressure state signal at control port 66 of flip-flop 61 will prevent AND-gate 56 from being enabled to reset flip-flop 39 until the overspeed condition is rectified and NOR-gate 71 is disabled. Upon this occurrence, the pressure state signal at control port 66 is dissipated and the brake application may be released as previously explained by movement of the locomotive brake valve device first to suppression and subsequently to release positions. As previously mentioned, the automatic brake valve device is designed in such a way that suppression position thereof will cause a full service train brake application, if not already in effect, and is therefore considered a safe condition. Also, due to design of the brake valve and to the various pressures at which different railroads operate, the control system herein described enforces a procedure upon the operator whereby the brake valve must be positively moved into release position after first being placed in suppression position before interlock valve 1 is reset to its normal position to assure that no relaxation of the brake application can occur when the brake valve is first moved to suppression position.

Having now described the invention, what we claim as new and desire to secure by Letters Patent, is:

1. A penalty brake control system comprising:
   a. a warning indicator device,
   b. interlock valve means,
   c. multistage counter means,
   d. first OR/NOR gate means responsive to a first preselected output of said counter to operate said warning indicator device, e. second OR/NOR gate means having a first output condition to move said interlock means to a normal position and a second output condition to move said interlock means to a penalty position, and f. bistable flip-flop means having a first and second condition and operable to said first condition in response to a second preselected output of said counter to dispose said second OR/NOR gate means in said second condition a predetermined time duration following the occurrence of said first preselected output of said counter.

2. A penalty brake control system as recited in claim 1, and further comprising a plurality of means for selectively controlling said counter means to effect a reset condition thereof.

3. A penalty brake control system as recited in claim 2, and further comprising means for continuously feeding an operating signal to drive said counter.

4. A penalty brake control system as recited in claim 3, wherein said means for continuously feeding an operating signal to drive said counter comprises oscillator means.

5. A penalty brake control system as recited in claim 2, wherein said plurality of means for controlling said counter to effect a reset condition thereof comprises:

a. a manually actuated push button valve means to provide a reset signal at said counter, b. multiinput OR gate means disposed in parallel with said manually actuated push button means and having one input adapted for connection to a locomotive brake cylinder pressure, and c. a second bistable flip-flop means having one input for connection to the suppression output of a brake valve device and having a corresponding output for providing a signal at another input of said multiinput "OR" gate means.

6. A penalty brake control system as recited in claim 1, and further comprising means for resetting said flip-flop means to said second condition.

7. A penalty brake control system as recited in claim 6, wherein said resetting means comprises means including AND gate means providing a reset output in response to a signal at one input of said AND gate produced by movement of a brake valve device to one position and to a concurrent signal at a second input of said AND gate produced by subsequent movement of the brake valve to a second position.

8. A penalty brake control system as recited in claim 7, wherein said means including said AND gate means further comprises a third flip-flop means having a first and second output condition and responsive at one input thereof to the output of said second flip-flop means when said brake valve device is mounted into said one position to provide an output for maintaining a signal at said one input of said AND gate when said brake valve device is subsequently moved to said second position.

9. A penalty brake control system as recited in claim 8, wherein said third flip-flop means includes a second input responsive to the output of said first flip-flop when said first flip-flop is in second condition whereby said third flip-flop is disposed in said first output condition.

10. A penalty brake control system as recited in claim 8, and further comprising:

a. electromagnetic valve means having a first position for communicating a source of pressure to atmosphere, and having a second position for communicating said source of pressure to an output, b. a second warning signal device actuatable when said electropneumatic valve means is disposed in said second position, c. said counter having an additional input which when pressurized effects said second preselected output, d. NOR gate means having a NOR output pressurizable in response to said second position of said electromagnetic valve device, said NOR output connected to said additional input.

11. A penalty brake control system as recited in claim 10, wherein said third flip-flop means includes a third input for disposing said third flip-flop in said first condition responsive to pressurization of said NOR output of said NOR gate.

12. A penalty brake control system as recited in claim 9, in which said counter produces a binary output and AND gate means are interposed between said counter and said second OR gate means, said AND gate being responsive to the outputs of at least two concurrently existing preselected outputs comprising said second preselected output of said counter.

13. A penalty brake control system, comprising:

a. a binary counter comprised of a plurality of stages of said pure fluid devices, b. said binary counter having:
  i. first input means for operating said counter in a cyclic manner in response to a signal at said first input means,
  ii. second input means for resetting said binary counter to a predetermined count condition only so long as said second input means is pressurized, and
  iii. output means for connection to associated apparatus, c. a reservoir, d. valve means operative to a first position for communicating said reservoir to a source of supply, and having a second position for communicating said reservoir to said second input means.

* * * * *